United States Patent Office 3,476,961
Patented Nov. 4, 1969

3,476,961
DYNAMOELECTRIC MACHINES
Jeffery Gerald Heard and Roy Brian Bennett, Stafford, England, assignors to The English Electric Company Limited, London, England
Continuation-in-part of application Ser. No. 446,209, Apr. 7, 1965. This application Aug. 21, 1967, Ser. No. 662,091
Claims priority, application Great Britain, Apr. 9, 1964, 14,742/64
Int. Cl. H02k 9/19
U.S. Cl. 310—54                                    3 Claims

ABSTRACT OF THE DISCLOSURE

This invention relates to dynamoelectric machines particularly to large alternating current generators having liquid cooled hollow rotor windings and liquid cooled hollow rotor winding leads. The invention provides a double lead arrangement in which each lead of one polarity comprises a pair of hollow conductor members which are electrically connected in parallel but which for the flow of cooling liquid are connected in series so that liquid enters one conductor member adjacent the rotor windings and flows through the conductor member back along the rotor shaft to the slip ring, or other source of direct current power and thence into and through the other conductor member back along the rotor shaft in the opposite direction and then into the hollow rotor windings.

---

This application is a continuation-in-part of U.S. application Ser. No. 446,209, being of common inventorship, which application is now abandoned.

This invention relates to dynamoelectric machines particularly to alternating generators having liquid cooled rotor windings and liquid cooled rotor winding leads.

According to the invention there is provided a rotor for an alternating current generator having a liquid cooled field winding and liquid cooled field winding leads which extend along the rotor shaft from the field windings to a source of direct current power for energising the field winding and in which liquid is supplied to the field winding coolant liquid flow path and the field winding leads from an axial inlet bore in the rotor shaft, in which each field winding lead comprises a pair of hollow conductor members electrically connected in parallel between the rotor winding and the excitation source, the bores of each associated pair of parallel connected conductor members communicating with one another at a position adjacent the said excitation source, the bore of one of each such associated pair of parallel connected conductor members communicating with the axial liquid inlet bore in the shaft at a position adjacent the rotor windings, the bore of the other hollow conductor member communicating with the rotor winding coolant liquid flow path so that coolant liquid flows in each pair of associated hollow conductor members firstly away from the rotor winding to the source of direct current power and then back towards and into the rotor winding.

An alternating current generator embodying the present invention will now be described, by way of example, in relation to FIGS. 1, 2 and 3 of the accompanying diagrammatic drawings, in which.

Figure 1:
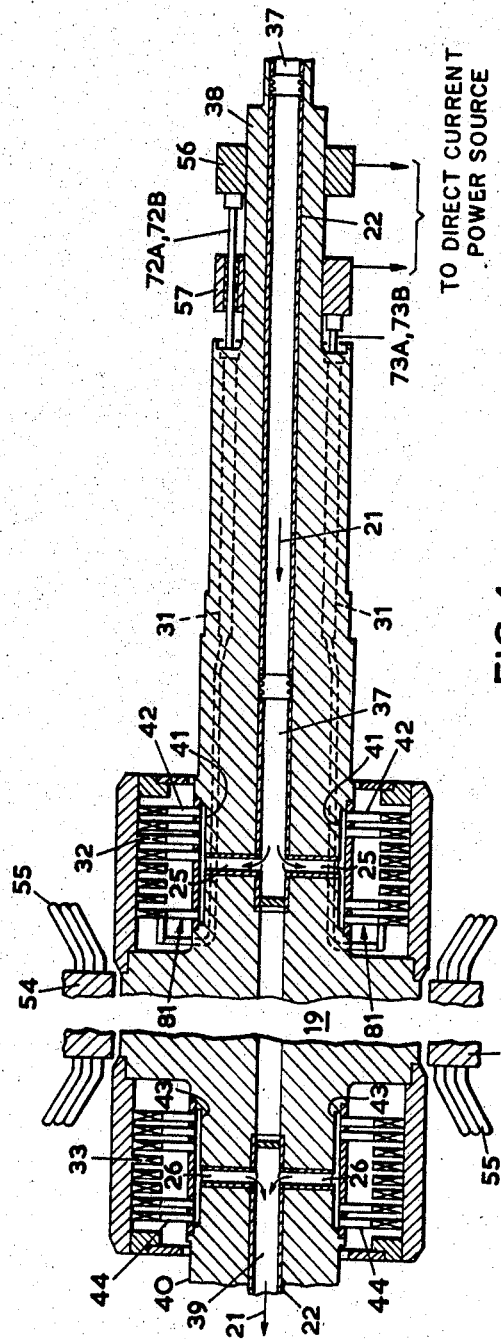
FIG. 1 is a section through the body and shaft of the generator rotor.

In FIG. 1 the rotor is generally indicated at 19 and an associated stator body is shown at 54 with stator winding end turns shown at 55.

The rotor 19 has a shaft 38 which has an axial bore 37 by which the cooling liquid is fed to the rotor winding and leads. Liquid is supplied to the axial bore 37 from a stationary inlet (not shown). Normally liquid from this stationary inlet passes first through hollow shafting of one or more exciter generators coupled to the hollow shaft of the generator rotor.

Liquid from the stationary source which eventually enters the axial bore 37 flows in the direction of the arrow 21 to one or more pairs of oppositely disposed radial ducts 25 and from these ducts into a respective one of one or more pairs of troughs 41 in the face of the rotor body beneath the end windings. Liquid flows from the troughs 41 into connectors some of which are shown at 42, and from these connectors the liquid flows into the ends of each coil of the rotor winding as well as into the end turns 32 of the coils. The coils with their end turns are made of hollow conductor bars so that the liquid flows from the hollow end turns into the coils of rotor windings.

Liquid flows through the hollow rotor windings to the hollow end turns 33 at the other end of the rotor and from these end turns the liquid is exhausted through connectors 44 and troughs 43 through radial ducts 26 and into another axial bore 39 to flow in the direction of the arrow 21 into an outlet chamber.

The axial bores 37 and 39 are lined with stainless steel liners 22 and the ducts 25 and 26 are similarly lined.

At the liquid inlet end of the shaft there is provided a pair of slip rings diagrammatically shown at 56 and 57 and the slip rings can be considered as the positive and negative terminals of a direct current power source of energizing the rotor winding. From the end of the shaft adjacent the slip rings there are two axial ducts 31 which extend into the rotor body to a point adjacent the end turns 32.

Each duct 31 accommodates two hollow conductor leads 72A and 72B, and 73A and 73B for connecting the slip rings with the rotor windings. The leads are arranged in pairs connected electrically in parallel and each separate pair of leads have their hollow bores connected to one another at their ends adjacent the slip rings.

Figure 2:
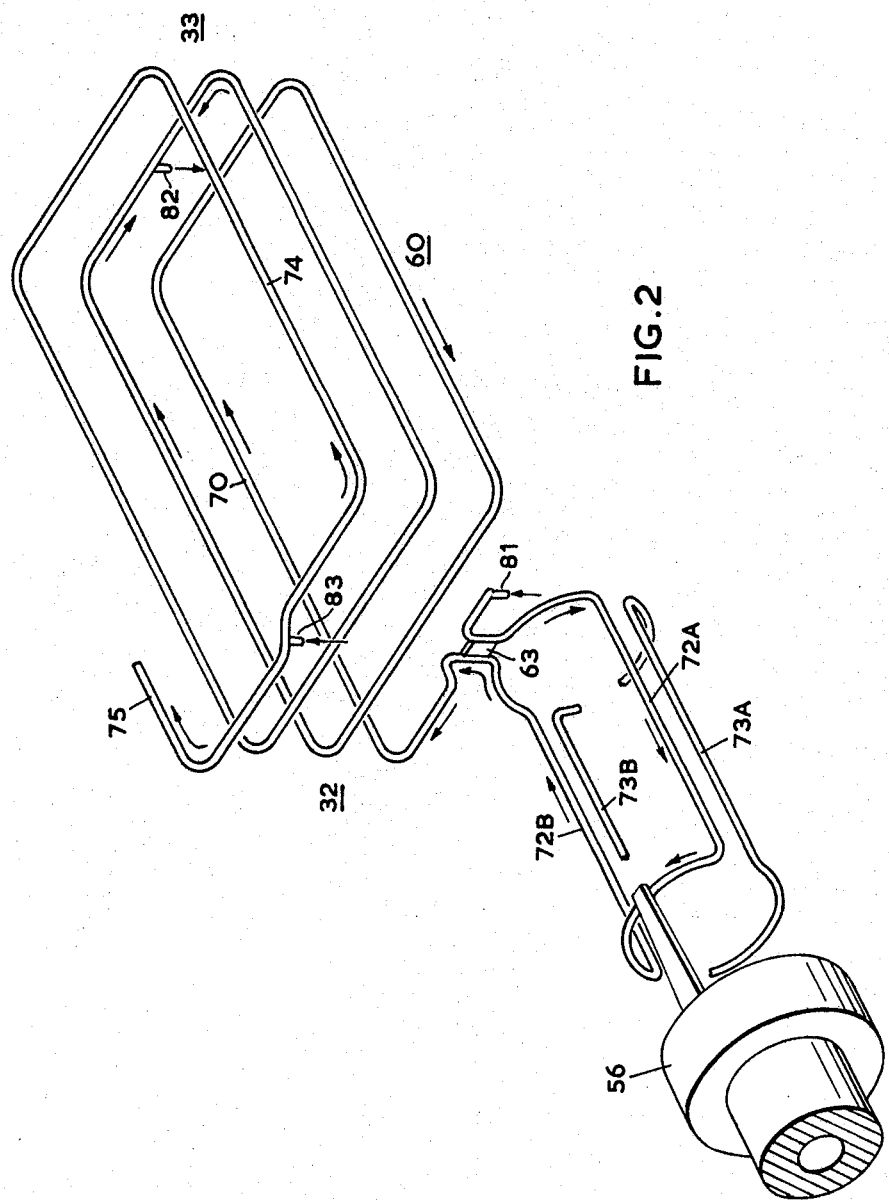
FIG. 2 shows in diagrammatic detail one coil of the rotor winding of FIG. 1 with its electrical and fluid connections and shows also a minor modification thereof.
Figure 3:
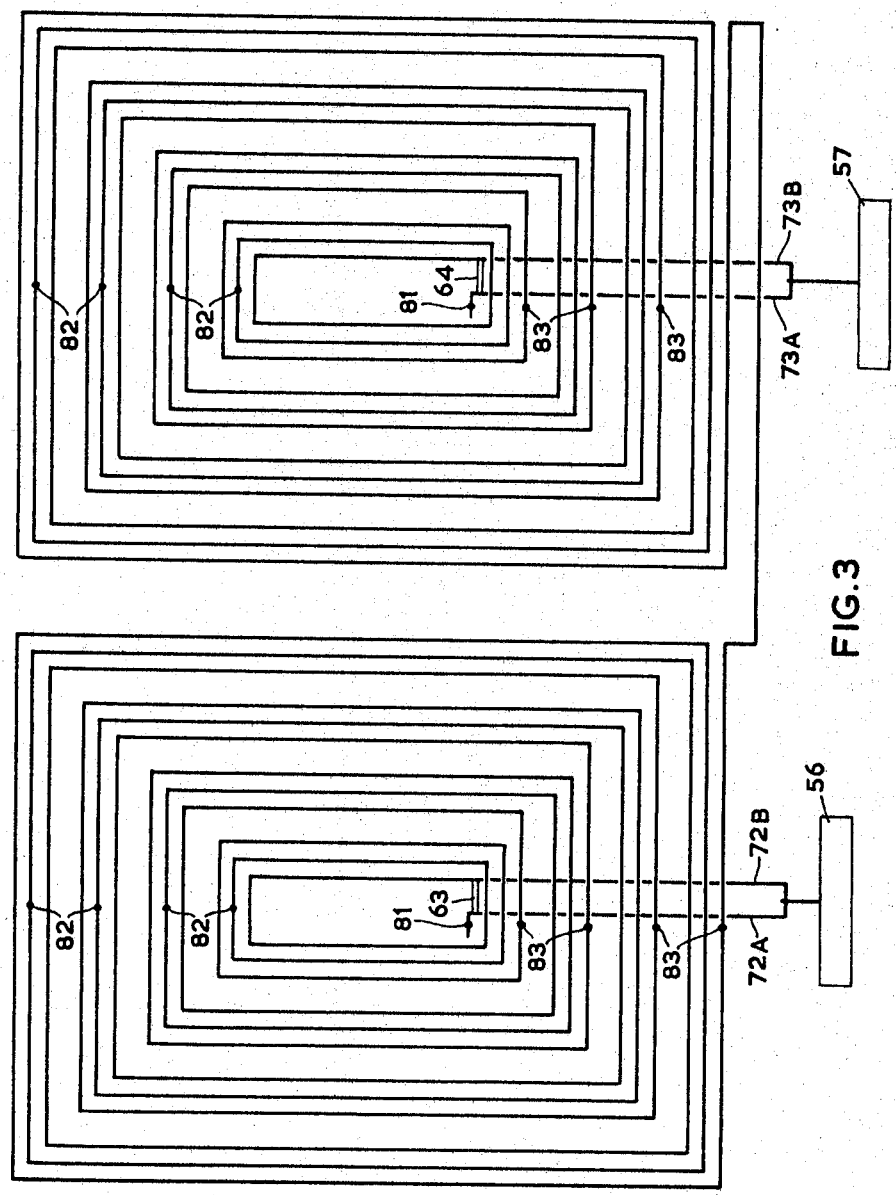
FIG. 3 is a diagrammatic drawing of the rotor winding of FIG. 1 embracing two poles.

FIG. 2 shows one way of connecting these leads to one coil 60 of the rotor windings and FIG. 3 diagrammatically shows the rotor winding. FIG. 2, however, shows a modification of the lead arrangement of FIG. 1 in that the leads are transposed so that both A and both B leads lie adjacent one another. The reason for this is explained later. For clarity FIGS. 2 and 3 show only three turns per coil of the winding whereas five or seven turns per coil could be used. Also FIG. 3 shows four coils per pole of the rotor winding whereas from the end turn of FIG. 1 it will be seen that there are eight coils per pole in FIG. 1, again this simplification is for the sake of clarity. The rotor winding has all the turns connected electrically in series, but there are a number of liquid flow paths connected in parallel, sixteen of these flow paths being shown in FIG. 3 which shows the leads 72A, 72B, 73A, 73B arranged as in FIG. 1.

Turning to FIG. 2 it will be seen that one end of the lead 72A receives liquid at the point 81. This liquid flows from the ducts 25 via the troughs 41 and one of the connectors 42 so that the liquid flows into the lead 72A at the point 81 (adjacent the rotor end turns as indicated in FIG. 1). The liquid then flows back to the slip ring 56, then back towards the coil 60 and into one turn side 70 at one end of the coil 60. At the point where the lead 72B joins the coil end at the turn side 70 the leads 72A and 72B are connected electrically together by an electrical connection shown at 63.

Thus the double lead 72A, 72B provides a single electrical connection from the slip ring 56 to one end of the coil 60 and a double cooling liquid flow path from the connector 63 back along the lead to the slip ring 56 and then back to the coil end at the turn side 70 as already explained.

The other two leads 73A and 73B are connected to the other slip ring 57 and to the other end of the rotor windings. The leads 73A and 73B provide a double flow path in the same manner as leads 72A and 72B and are similarly electrically connected together at the end of the coil by a connector 64 (FIG. 3).

FIGS. 2 and 3 show the flow path of liquid which enters the winding from the connectors 42. In FIGS. 2 and 3 the inlet points of the liquid are indicated at 83, which are actually situated at the point where the electrical connections between coils are made. Liquid entering at point 83 divided to flow in both directions and flows through one section of each coil supplied to reach respective liquid outlets 82. The liquid inlets 81 and 83 are connected to the connectors 42 and the liquid outlets 82 are connected to the connectors 44. The connectors 42 and 44 are not shown in FIGS. 2 and 3.

It will be seen that the lead and coil cooling arrangement described above not only provides two heavy double electrical leads cooled along their whole length but the connection to the winding only requires the liquid which has cooled the leads to flow along one half of a coil before it is exhausted from the coil.

In the arrangement described in relation to FIGS. 1 and 3 the field current would flow in the leads 72A and 72B in a direction from the slip ring 56 to the coil 60 whereas the current in the leads 73A and 73B would flow to the slip ring 57. With large modern generators the field current will be very large and as the field leads are situated in ducts 31 away from the shaft centre a magnetic field could be set up linking the shaft if the field leads in each duct 31 carry current in the same direction. This magnetic field could generate voltages in components adjacent the shaft, particularly in the bearings.

In a practical arrangement, therefore, the lead 72A or 72B would be accommodated in one of the axial ducts 31 with one of the leads 73A or 73B and the other two leads would be accommodated in the other axial duct 31. This arrangement is illustrated in FIG. 2 in which it will be noted that the positive and negative leads 72B and 73B are adjacent one another as are positive and negative leads 72A and 73A, thus no magnetic field occurs external to the shaft.

We claim:
1. A rotor for an alternating current generator having a liquid cooled field winding and liquid cooled field winding leads which extend along the rotor shaft from the field winding to the terminals of a source of direct current power for energising the field winding and in which liquid is supplied to the field winding coolant liquid flow path and the field winding leads from an axial inlet bore in the rotor shaft, in which each field winding lead comprises a pair of hollow conductor members electrically connected in parallel between the rotor winding and the excitation source, the bores of each associated pair of parallel connected conductor members communicating with one another at a position adjacent the terminals of said excitation source, the bore of one of each such associated pair of parallel connected conductor members communicating with the axial liquid inlet bore in the shaft at a position adjacent the rotor winding, the bore of the other hollow conductor member communicating with the rotor winding coolant liquid flow path so that coolant liquid flows in each pair of associated hollow conductor members firstly away from the rotor winding to the terminal of the source of direct current power and then back towards and into the rotor winding.

2. A rotor according to claim 1 in which the field winding leads extend along the rotor shaft adjacent the outer periphery thereof, one of each pair of hollow conductor members having one end connected to one end of the rotor winding and the other end thereof connected to the positive terminal of the direct current power source and the other of each pair of hollow conductor members having one end connected to the other end of the rotor winding and the other end thereof connected to the negative terminal of the direct current power source.

3. A rotor according to claim 1 in which coupling to said direct current power source comprises a plurality of slip rings.

References Cited

UNITED STATES PATENTS

| 2,862,119 | 11/1958 | Else et al. | 310—54 |
| 3,145,314 | 8/1964 | Becker | 310—68 |

FOREIGN PATENTS

| 870,721 | 6/1961 | Great Britain. |

WARREN E. RAY, Primary Examiner

R. SKUDY, Assistant Examiner

U.S. Cl. X.R.

310—58; 61